UNITED STATES PATENT OFFICE.

JOHN SPANGENBERG, OF NEW YORK, N. Y.

IMPROVEMENT IN DEFECATING AND CLARIFYING SACCHARINE JUICES.

Specification forming part of Letters Patent No. 22,988, dated February 15, 1859.

*To all whom it may concern:*

Be it known that I, JOHN SPANGENBERG, of the city and State of New York, have invented, made, and applied to use a certain new and useful improvement in means for defecating, decolorizing or bleaching, and clarifying sirups, saccharine solutions and liquids from sugar-cane, and other saccharine and vegetable juices; and I do hereby declare that the following is a full, clear, and exact description of the manner of applying my invention and the results attained thereby.

For the above purposes I make use of an acid sulphite of tin, either alone or in combination with alumina, lime, or other alkalies, as hereinafter set forth, the same being distinguished, both in the article itself and its operation on said sirups or juices, from sulphate of tin, lime, &c. To the cane-juice, sirups, or melted sugar to be operated upon, contained in the clarifying-kettle or "blow-up," add sufficient milk of lime or fresh slaked lime to partially neutralize the free or natural acid contained in said material, stir the same well, and immediately add thereto the acid sulphite of tin, in the proportion of one quart or more to each hundred gallons of cane-juice or sirup, also stirring the mass thoroughly, so that the ingredients will intimately mix or commingle. Alumina may be added with the sulphite of tin when required. Just before the juice or liquid begins to boil, skim in the usual way, or else allow it to boil, and then pass the liquid through bags or other filters.

If the sirups are for refining purposes, a greater quantity of the acid sulphite of tin may be used, taking care to add sufficient lime to neutralize the excess of sulphite of tin thus employed. About two ounces of lime will be found sufficient to neutralize every gallon of sulphite of tin that is used. When the juice or sirup in the clarifier or blow-up is finished, decolorized, and defecated, as above directed, blue litmus-paper should show a slight reaction of acidity, or a purplish-red color. Again, if the operator prefers it, the acid sulphite of tin may be applied in the first instance to the sirup or cane-juice, and after being well stirred allowed to remain in contact with the liquid for about two minutes. Then add the lime as directed above, in the same quantity and for the same purpose.

The acid sulphite of tin herein mentioned is manufactured as follows: Take the tin-crystals of commerce (muriate of tin) and dissolve them in about four times their weight of water. Then add to the above dissolved soda-ash (in water) until the solution of the tin does not redden litmus-paper. Allow the liquid to remain tranquil until the hydrate of oxide of tin precipitates. Draw off or decant the top liquid, (muriate of soda.) Then fill up the vessel again with fresh water, stir and allow it to subside, and draw off the liquid, as before. This operation must be repeated until the water has no brackish or saltish taste. The hydrated oxide of tin deposited on the bottom of the vessel is converted into an acid sulphite of tin by injecting the fumes of sulphur into water containing said hydrated oxide of tin in suspension. This may be done by forcing in the fumes by a suitable pump, so as to give sufficient strength to the sulphurous acid—say 5° Baumé—when it will be found that the hydrated oxide of tin has been taken into solution, forming a sulphite of tin such as heretofore set forth, for use in the manner specified. Granulated or feathered tin may be saturated in muriatic acid, and then treated as before, in place of using the tin-crystals.

The peculiarity in the use of sulphite of tin is that the sugar or cane-juice is by it both defecated and clarified, whereas the bisulphite of lime or acid sulphite of lime was used for meeting or preventing oxidation or coloring of the juices, and was useless for defecating purposes. The acid sulphite of tin not only defecates and clarifies, but cuts the gum and forms insoluble compounds with the mucilage, albumen, and caseine, causing them to rise to the surface in scum, or be precipitated to the bottom, or filtered out in the bags.

I do not claim the use of bisulphite of lime as used by Melsen and others; neither do I herein claim the use of sulphate of tin, as the same is said to be the invention of Augustus H. Tait, and by him assigned to George B. Hartson; but the two articles are essentially different in their chemical nature, as well as in their effect in clarifying or defecating sirups, juices, &c., the sulphate of tin being sulphuric acid and oxide of tin combined, and the other being sulphurous acid and oxide of tin combined, which, in its operation on the sirups or juices, is far more efficacious in defecating, decolorizing or bleaching, and clarifying the same. Therefore

What I claim as my invention, and desire to secure by Letters Patent, is—

The application of hydrated oxide of tin prepared with sulphurous acid, substantially as herein set forth, for the purpose of decolorizing or bleaching and defecating sirups, saccharine solutions and liquids from sugar-cane, and other saccharine and vegetable juices, whether the same be used alone or in combination with alumina, as set forth.

In witness whereof I have hereunto set my signature this 2d day of December, 1858.

J. SPANGENBERG.

Witnesses:
   LEMUEL W. SERRELL,
   THOMAS G. HAROLD.